(12) United States Patent
Vahey

(10) Patent No.: US 10,871,405 B2
(45) Date of Patent: Dec. 22, 2020

(54) INDICATOR DEVICE AND METHOD

(71) Applicant: The Boeing Company, Chicago, IL (US)

(72) Inventor: Paul G. Vahey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 697 days.

(21) Appl. No.: 15/607,858

(22) Filed: May 30, 2017

(65) Prior Publication Data
US 2018/0348067 A1 Dec. 6, 2018

(51) Int. Cl.
| | |
|---|---|
| *G01K 11/16* | (2006.01) |
| *G01J 5/58* | (2006.01) |
| *G01J 5/08* | (2006.01) |
| *G01J 5/60* | (2006.01) |
| *G01J 3/04* | (2006.01) |
| *G01K 3/04* | (2006.01) |

(52) U.S. Cl.
CPC ........... *G01K 11/16* (2013.01); *G01J 5/0887* (2013.01); *G01J 5/58* (2013.01); *G01J 5/601* (2013.01); *G01K 3/04* (2013.01)

(58) Field of Classification Search
CPC . G01K 11/16; G01K 3/04; G01J 5/601; G01J 5/0887; G01J 5/58
See application file for complete search history.

(56) References Cited

U.S. PATENT DOCUMENTS

| | | | | |
|---|---|---|---|---|
| 3,948,346 A * | 4/1976 | Schindler | .................. | E04B 1/86 181/286 |
| 4,215,208 A * | 7/1980 | Yee | ........................ | C08F 38/00 526/285 |
| 5,376,793 A * | 12/1994 | Lesniak | ................. | G01N 25/72 250/330 |
| 6,500,555 B1 * | 12/2002 | Khaldi | ..................... | B32B 7/02 428/457 |
| 7,067,834 B2 * | 6/2006 | Horigane | ................ | G01N 1/36 250/576 |
| 7,127,950 B2 * | 10/2006 | Fonov | ....................... | G01L 1/24 73/800 |
| 7,398,698 B2 * | 7/2008 | Griess | ................. | G01M 5/0033 702/36 |
| 7,826,124 B2 * | 11/2010 | Xu | ........................ | C07D 493/04 359/270 |
| 8,330,122 B2 * | 12/2012 | Smith | ................ | G06K 9/00577 250/458.1 |
| 8,409,662 B2 * | 4/2013 | Agrawal | .................. | B05D 5/06 427/157 |
| 8,525,990 B2 * | 9/2013 | Wilcken | .................... | G01J 3/02 356/326 |
| 8,541,094 B2 * | 9/2013 | Miller | .................... | B05D 5/063 427/162 |
| 8,581,736 B2 * | 11/2013 | McIver | ............... | G01M 5/0091 340/665 |
| 8,657,067 B1 * | 2/2014 | Mathur | ..................... | B32B 5/24 181/284 |

(Continued)

*Primary Examiner* — Nimeshkumar D Patel
*Assistant Examiner* — Tania Courson
(74) *Attorney, Agent, or Firm* — Perman & Green LLP

(57) ABSTRACT

An indicator device including a protective layer, an optically reflective layer, a polymeric material layer disposed between and coupling the protective layer to the optically reflective layer, and a dye disposed within the polymeric material layer, the dye being sensitive to external stimuli.

20 Claims, 6 Drawing Sheets

(56) References Cited

U.S. PATENT DOCUMENTS

| | | | | |
|---|---|---|---|---|
| 8,720,278 B1* | 5/2014 | Toivola | G01B 11/16 | |
| | | | 73/762 | |
| 8,867,132 B2* | 10/2014 | McCarthy | G02B 5/23 | |
| | | | 349/104 | |
| 8,871,334 B2* | 10/2014 | Kalkanoglu | B44F 1/10 | |
| | | | 428/212 | |
| 9,017,499 B2* | 4/2015 | Evens | B29C 73/10 | |
| | | | 156/94 | |
| 9,085,052 B1* | 7/2015 | Georgeson | G01K 13/00 | |
| 9,222,015 B2* | 12/2015 | Becker, IV | C09K 9/02 | |
| 9,372,177 B2* | 6/2016 | Georgeson | C09D 5/26 | |
| 9,404,854 B2* | 8/2016 | Hunt | G01N 21/3581 | |
| 9,446,575 B1* | 9/2016 | Georgeson | G01K 13/00 | |
| 9,656,453 B2* | 5/2017 | Georgeson | B32B 41/00 | |
| 9,873,527 B2* | 1/2018 | Degaetano | B29C 35/0288 | |
| 9,931,827 B2* | 4/2018 | Georgeson | G01B 11/16 | |
| 9,945,735 B2* | 4/2018 | Georgeson | G01N 21/64 | |
| 9,970,833 B2* | 5/2018 | Georgeson | G01L 1/24 | |
| 10,024,792 B2* | 7/2018 | Toivola | G01M 99/007 | |
| 10,302,573 B2* | 5/2019 | Vahey | G01J 3/10 | |
| 10,317,345 B2* | 6/2019 | Luxton | G01N 21/4738 | |
| 2003/0016359 A1* | 1/2003 | Jung | G01J 3/0218 | |
| | | | 356/419 | |
| 2004/0134280 A1* | 7/2004 | Hedberg | G01N 29/045 | |
| | | | 73/579 | |
| 2006/0190957 A1* | 8/2006 | Habuta | G11B 7/24038 | |
| | | | 720/718 | |
| 2008/0209825 A1* | 9/2008 | Smith | E04D 13/006 | |
| | | | 52/169.14 | |
| 2011/0123712 A1* | 5/2011 | Becker, IV | C09K 9/02 | |
| | | | 427/162 | |
| 2014/0328369 A1 | 11/2014 | Flinn et al. | | |
| 2019/0143366 A1* | 5/2019 | Hunt | G02B 1/02 | |
| | | | 427/458 | |
| 2019/0143661 A1* | 5/2019 | Hunt | B05D 1/28 | |
| | | | 156/60 | |
| 2019/0277703 A1* | 9/2019 | Valouch | H01L 31/02966 | |
| 2019/0293486 A1* | 9/2019 | Wheatley | G01J 3/28 | |

* cited by examiner

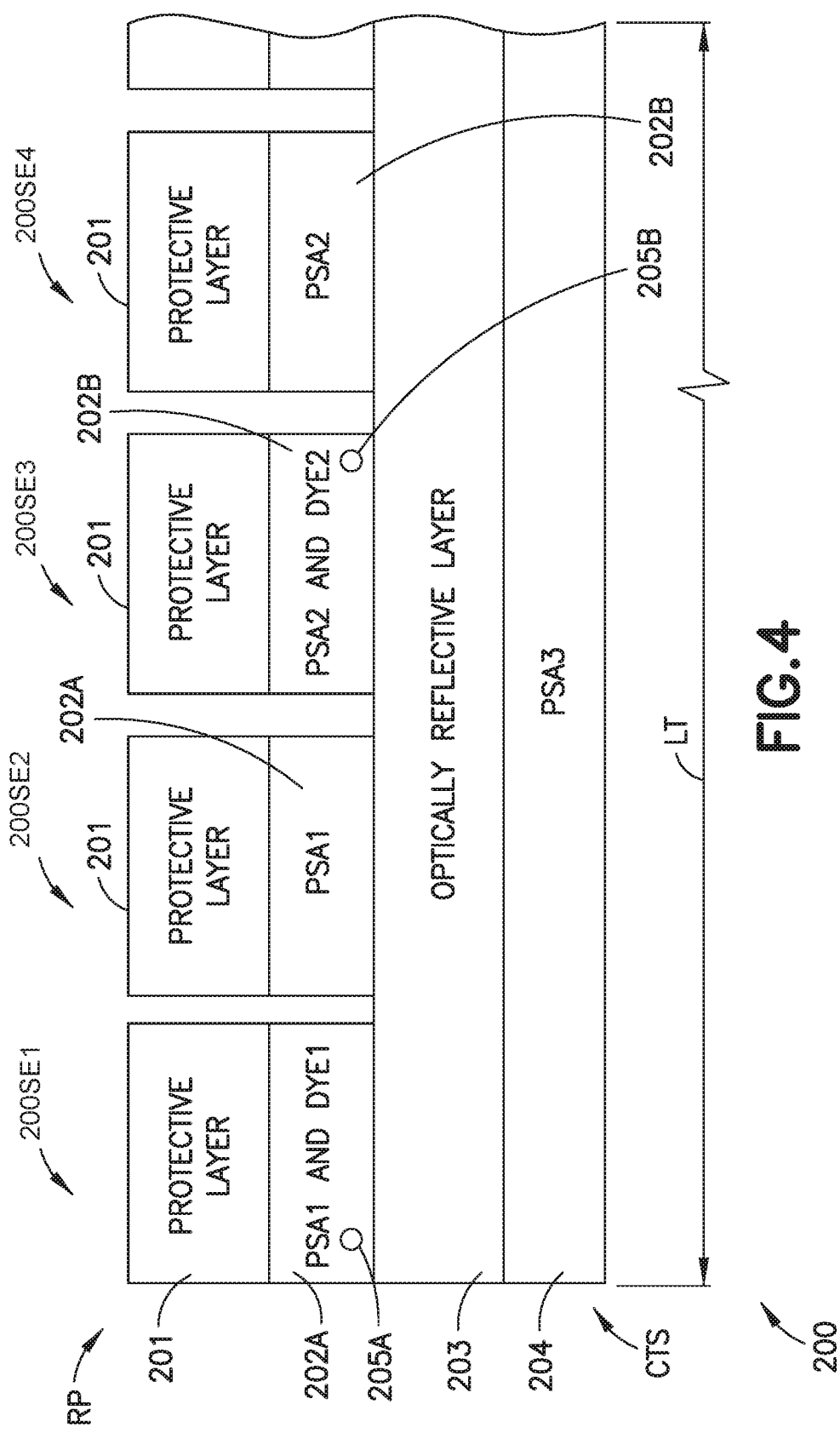

INDICATOR DEVICE AND METHOD

BACKGROUND

1. Field

Aspects of the present disclosure generally relate to thermal exposure monitoring and inspection techniques, and more particularly to non-destructive thermal exposure monitoring and inspection apparatuses and methods.

2. Brief Description of Related Developments

Carbon fiber and carbon fiber composites have seen increasing use as structural components in aircraft due to their stiffness, strength and light weight. However, carbon fiber and carbon fiber composite aircraft parts are subject to thermal degradation from, for example, fires, lightning strikes, ground-reflected efflux from aircraft engines, accidents, etc. In some instances the aircraft parts may appear to be visibly undamaged and undamaged upon inspection by common non-destructive testing evaluation methods such as ultrasound, but the aircraft parts may exhibit strength loss referred to as incipient thermal damage.

There are various conventional non-destructive evaluation techniques that may be used to try and evaluate/detect incipient thermal damage, such as laser-induced fluorescence, Raman spectroscopy, Fourier transform infrared spectroscopy, and nuclear magnetic resonance spectroscopy. These conventional non-destructive evaluation techniques are generally employed after the part has been thermally exposed and do not allow for monitoring thermal activity of the part in-situ (e.g., during thermal exposure). In addition, these conventional non-destructive evaluation techniques, while capable of detecting thermal damage on a part, may not be very efficient for inspecting large parts if the damage location is not known. Because incipient thermal damage of aircraft parts can be difficult to locate visually, conventional non-destructive techniques may pose a problem (e.g., require excessive inspection times) for inspecting large aircraft parts for thermal damage in a timely manner.

Thermal non-destructive evaluation has also been performed with thermally sensitive dyes using fluorescence spectroscopy. For example, fluorescent dyes have been incorporated into the composite resin of the part for diagnosis of the thermal exposure of the part. However, fluorescence from the material (e.g., the aircraft parts) being evaluated interferes with the detection/evaluation of the fluorescence of the temperature sensitive dye because, for example, of the low energy emission provided by fluorescence. While fluorescence measurements are useful, they may be limited by interference from ambient light, relatively low signal strength that may require 20-60 seconds per measurement. Also, as noted above, interference from the part reduces the quality of data (signal-to-noise ratio) obtained from fluorescence spectroscopy. In addition, different light filters/sources are needed for each dye used and the fluorescence emitted by the dyes varies with dye concentration and thickness. It is also noted that there are a finite number of wavelength combinations available for fluorescence excitation and emission. As such, thermally sensitive dyes that are compatible with the part being measured may be limited, due to for example, overlapping excitation and emission fluorescence bands. The fluorescence from the part may also be difficult to subtract from the results of the fluorescence spectroscopy. For example, as the part is changed by thermal exposure, the part's fluorescing behavior also changes because fluorescence and other signals change wavelengths and intensities due to the thermal reaction within the part. All of this makes the interference from the underlying part difficult to subtract from the fluorescence spectroscopy.

These shortcomings lead to the use of attachable temperature monitors including thermocouples and temperature tabs/labels (e.g., adhesive devices that attach to the part and change color for monitoring temperatures). One problem with thermocouples is that only a very small area can be measured, because wires must be run between the thermocouple and a controller/recorder. To monitor a large area requires hundreds or thousands of thermo-couples, along with large bundles of wires, all of which necessitate a large amount of set-up time. One problem with the temperature tabs/labels is that non-reversible tabs/labels change color upon a predetermined temperature being reached. As such, a large number of these non-reversible tabs/labels would be required without knowing the upper temperature to which the part will be exposed. Further, with respect to reversible tabs/labels (which provide in-process temperature monitoring), such tabs/labels may not be accessible during thermal exposure for viewing.

SUMMARY

The following is a non-exhaustive list of examples, which may or may not be claimed, of the subject matter according to the present disclosure.

One example of the subject matter according to the present disclosure relates to an indicator device comprising: a protective layer; an optically reflective layer: a polymeric material layer disposed between and coupling the protective layer to the optically reflective layer; and, a dye disposed within the polymeric material layer, the dye being sensitive to external stimuli.

Another example of the subject matter according to the present disclosure relates to an indicator device comprising: an optically reflective layer; and a plurality of sensor elements disposed on the optically reflective layer, at least one of the plurality of sensor elements including a protective layer; a polymeric material layer disposed between and coupling the protective layer to the optically reflective layer; and, a dye disposed within the polymeric material layer, the dye being sensitive to external stimuli.

Still another example of the subject matter according to the present disclosure relates to a method for measuring a determinable quantity, the method comprising: coupling an indicator device to a surface of a part, where the indicator device includes at least one sensor element having a protective layer, an optically reflective layer, a polymeric material layer disposed between and coupling the protective layer to the optically reflective layer, and a dye disposed within the polymeric material layer, the dye being sensitive to external stimuli; and, interrogating the indicator device in the visible spectrum with absorbance spectroscopy to determine a value of the determinable quantity affecting the part.

BRIEF DESCRIPTION OF THE DRAWINGS

Figure 1:
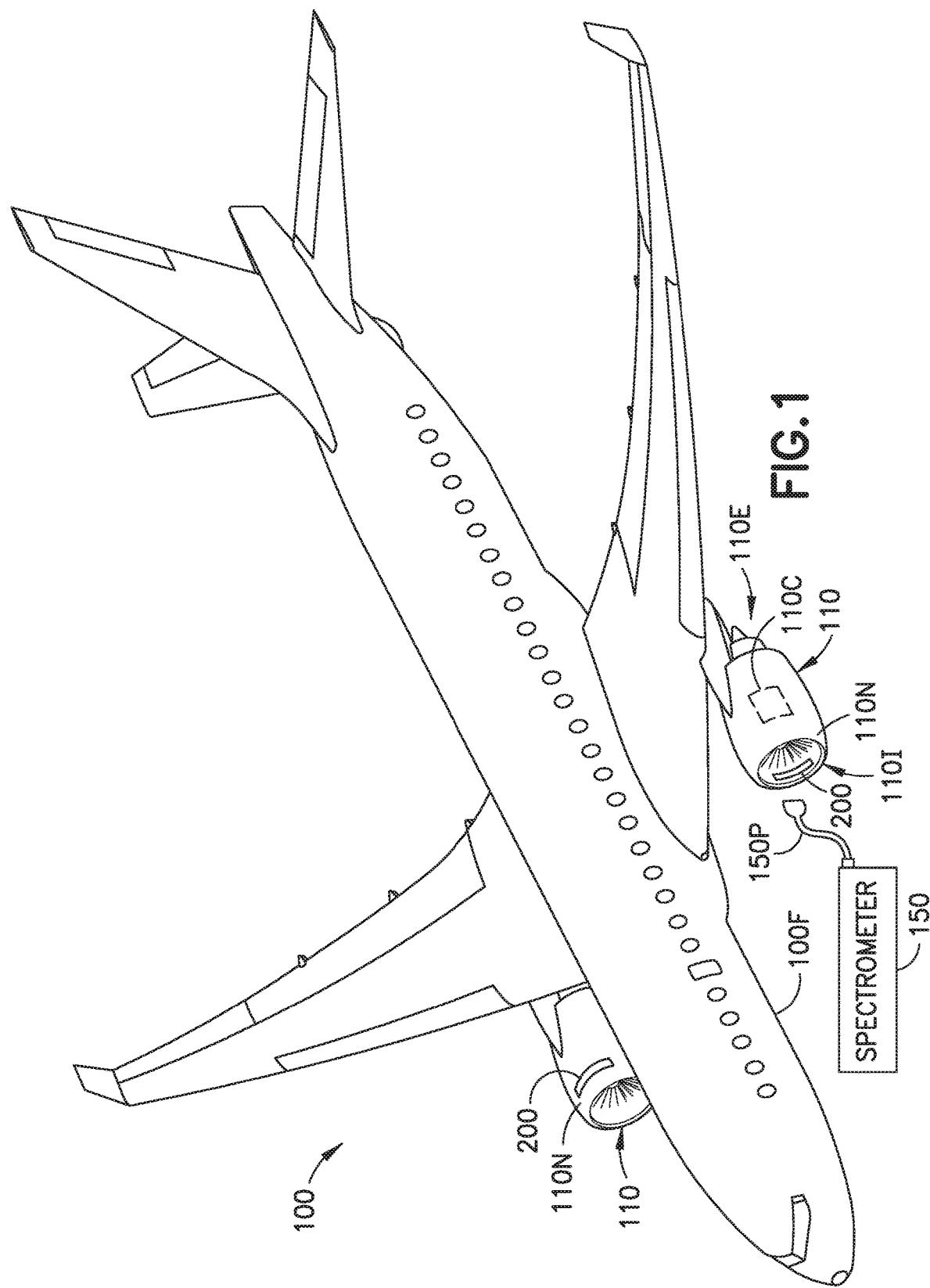
Figure 2:
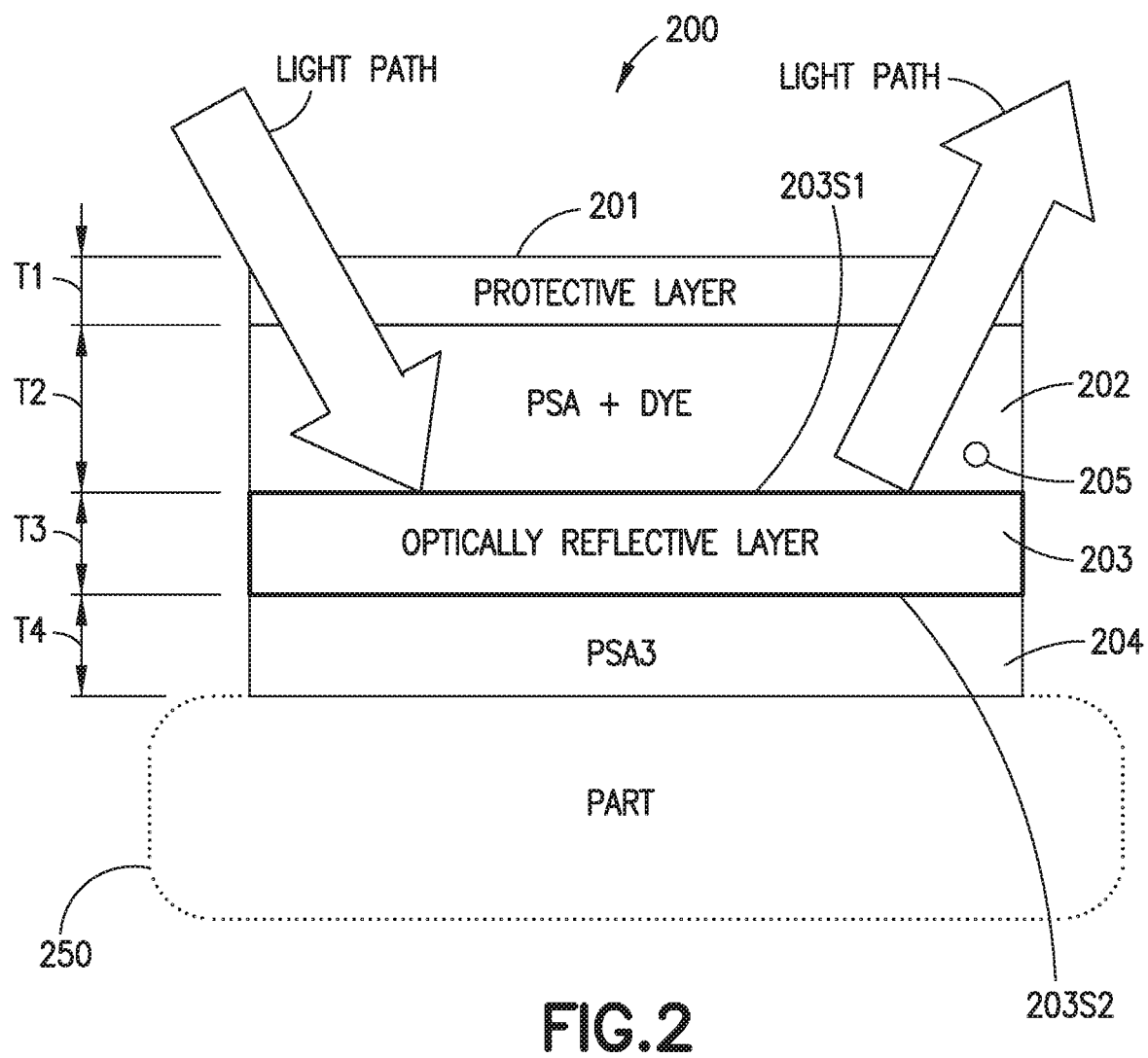
Figure 3:
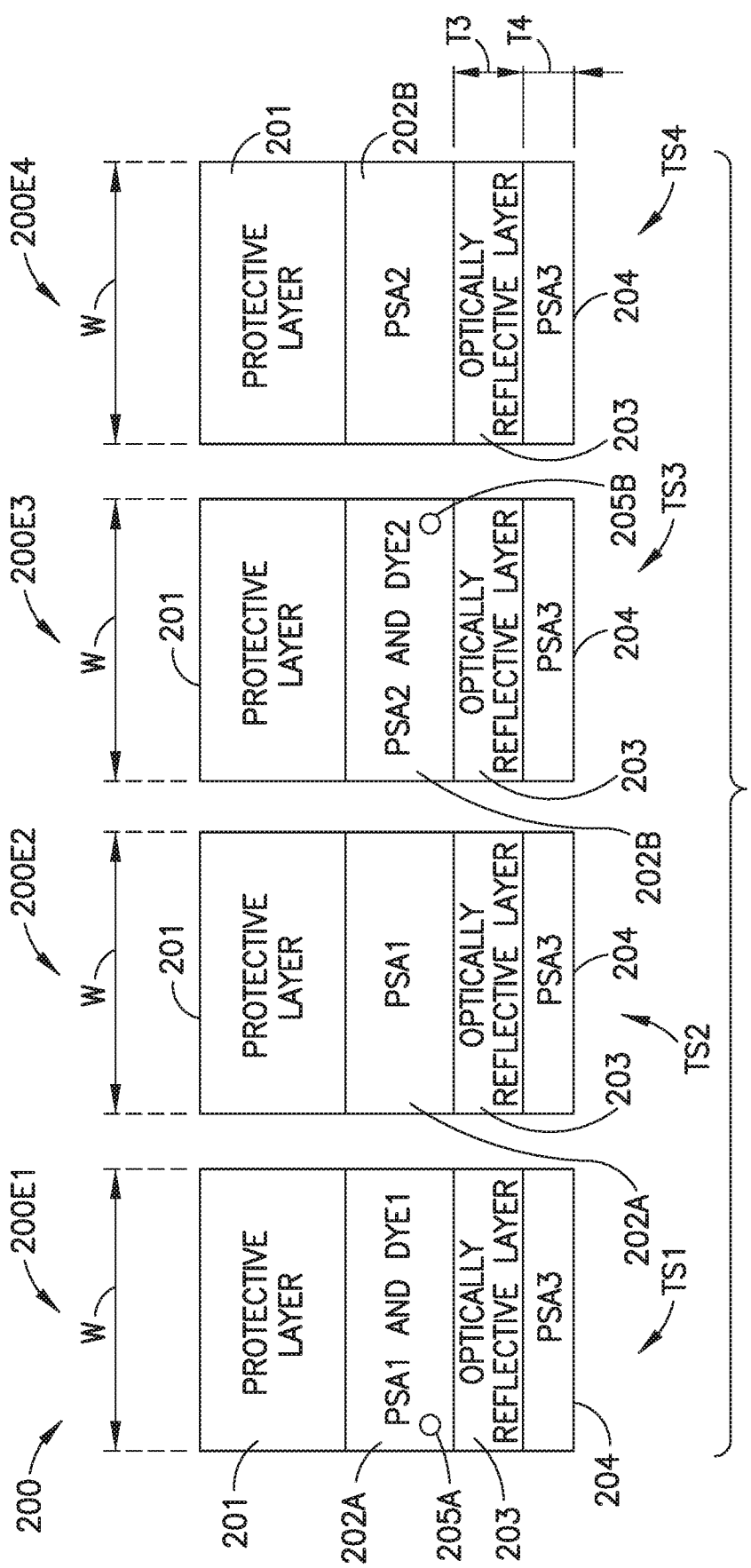
Figure 3A:
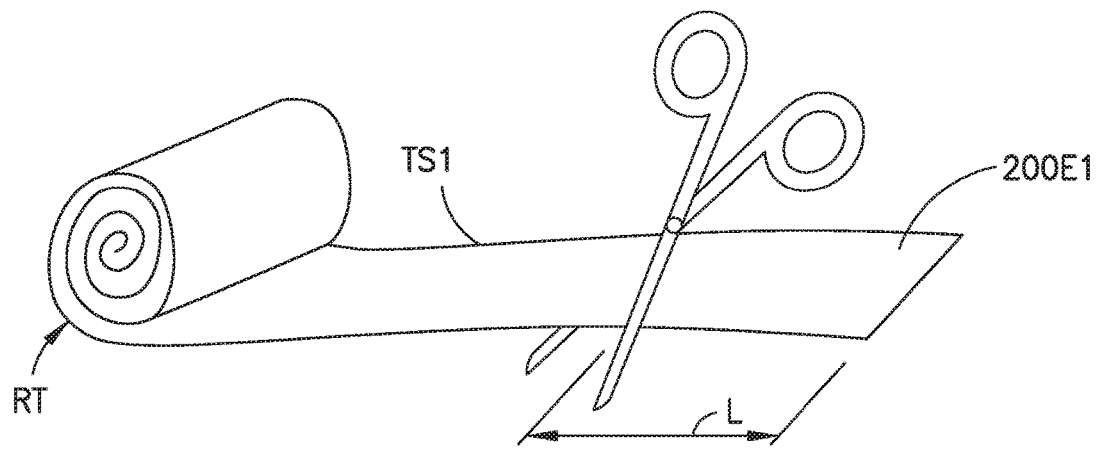
Figure 4A:
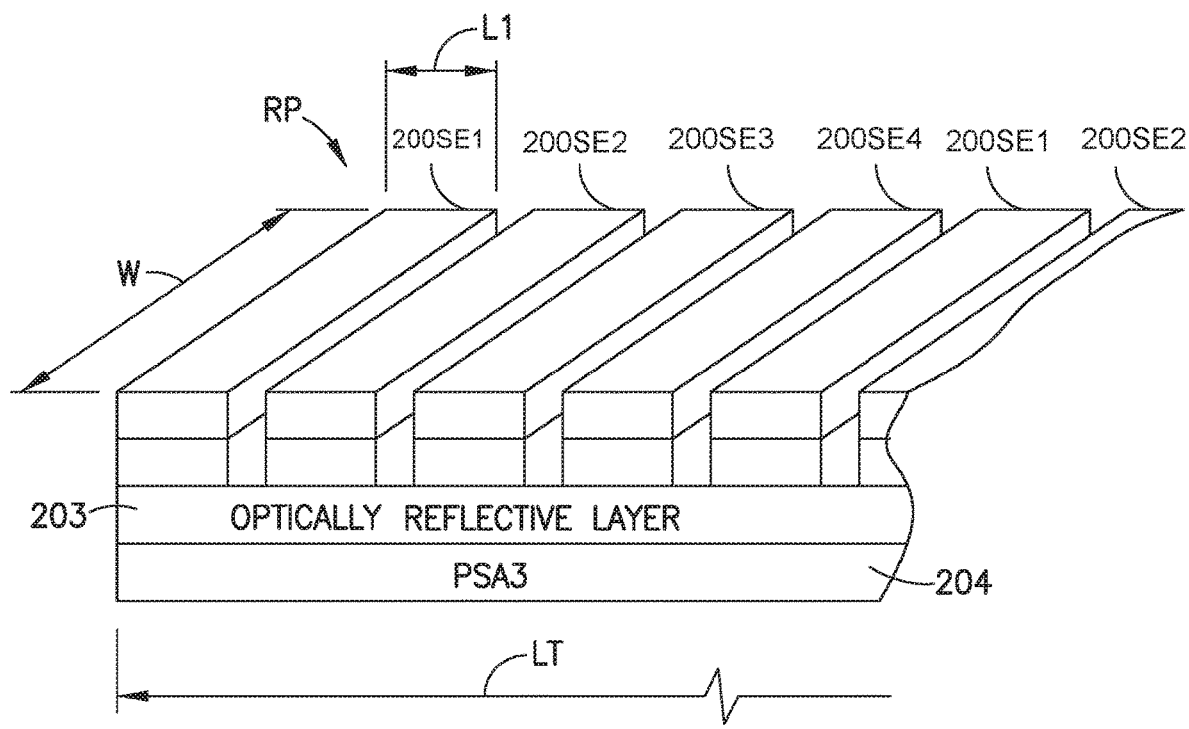
Figure 5:
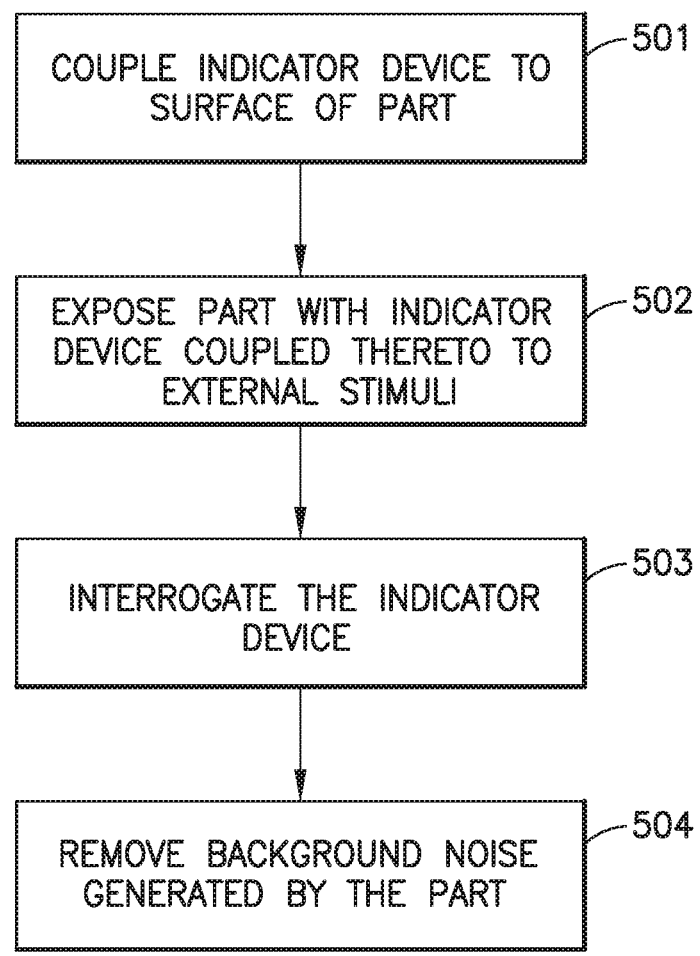

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of an aircraft incorporating aspects of the present disclosure;

FIG. 2 is schematic a cross-sectional illustration of an indicator device in accordance with aspects of the present disclosure;

FIG. 3 is a schematic cross-sectional illustration of portions of an indicator device in accordance with aspects of the present disclosure;

FIG. 3A is a schematic perspective view of a roll of tape formed by an indicator device in accordance with aspects of the present disclosure;

FIG. 4 is a schematic cross-sectional illustration of an indicator device in accordance with aspects of the present disclosure;

FIG. 4A is a schematic perspective view of the indicator device of FIG. 4 in accordance with aspects of the present disclosure; and FIG. 5 is a flow diagram of a method in accordance with aspects of the present disclosure.

DETAILED DESCRIPTION

Referring to FIGS. 1 and 2, aspects of the present disclosure provide for non-destructive evaluation of external stimuli (such as thermal effects and mechanical forces) on any suitable part(s), such as aircraft parts. For example, aspects of the disclosed embodiment provide an indication of a determinable quantity, such as temperature exposure (e.g., a time-temperature indication for a part 250, which includes the temperature the part was exposed to and an amount of time the part was exposed to that temperature) or any other determinable quantity such as impact force, stress, and strain.

Aspects of the present disclosure provide an indicator device 200 that includes an optically reflective layer 203 that optically isolates a dye 205 (although in other aspects the dye may be any suitable dye sensitive to external stimuli such as temperature and/or mechanical forces) of the indicator device 200 from the part 250 being evaluated for thermal exposure. The optical isolation of the dye 205 from the part 250 with the optically reflective layer 203 reduces or substantially eliminates interference from the part 250 (e.g., improves the signal-to-noise ratio of the indicator device 200, compared to conventional fluorescence-type indicators, making the indicator device 200 less susceptible to interference from the part 250 being monitored) and provides for the evaluation of the part 250 using non-destructive evaluation techniques beyond (but inclusive of) fluorescence spectroscopy by providing for the use of any suitable spectrometry technique/method, including but not limited to broad-band absorbance spectroscopy. Broad-band absorbance spectroscopy can be performed using a simple white light source to interrogate the dye(s) 205 of the indicator device 200, instead of one or more specialized light sources that would be required for fluorescence or Raman spectrometry. Absorbance spectrometry is considerably faster to perform than fluorescence spectroscopy (e.g., interrogation with broad-band absorbance spectroscopy requires about 10 milliseconds to about 30 milliseconds per scan, whereas interrogation with fluorescence spectroscopy requires about 10 seconds to about 30 seconds per scan).

It should be understood that while the aspects of the present disclosure are described herein with respect to temperature indicators (i.e., indicators that monitor an amount of heat that goes into a part or the thermal load which is the time the part is exposed to a temperature), aspects of the present disclosure may also be employed as sensors that monitor mechanical forces, such as impact force, stress, and/or strain, using dyes that are sensitive to mechanical forces. For example, where the impact forces, stress, and/or strain are monitored using fluorescence, the optically reflective layer 203 is incorporated into the mechanical force sensor, in a manner similar to that described herein, to isolate the fluorescence of the dyes from the fluorescence of the part 250.

Referring to FIGS. 2 and 3, a portion of the indicator device 200, in accordance with aspects of the present disclosure, provides a control sensor element(s) (see sensor elements 200E2, 200E4) for subtracting thermal effects on the matrix of the indicator device 200 from the thermal evaluation of the part 250. It is noted that the aspects of the present disclosure provide for the thermal evaluation of heterogeneous (e.g., one piece of the same material) or non-homogenous (e.g., more than one piece of the same or different material) parts 250 due to the optical isolation of the part 250 by the reflective layer 203.

While aspects of the present disclosure are described herein with respect to aircraft parts/components it should be understood that the aspects of the present disclosure may be applied to any suitable component of any suitable equipment for non-destructive evaluation of thermal effects on the components being evaluated. For example, aspects of the present disclosure can be applied to automotive equipment/parts, maritime equipment/parts, aerospace equipment-parts, manufacturing tool components, ovens, etc.

Referring to FIG. 1, in one aspect, one or more indicator devices 200 can be applied to an aircraft 100 for evaluating thermal effects on a predetermined portion of the aircraft 100. For example, the aircraft includes an airframe 100F and one or more engines 110 coupled to the airframe 100F. The engines 110 generally include an air intake 110I, a combustion chamber 110C and an exhaust 114E. A nacelle 110N generally encloses the engine and aerodynamically forms part of the air intake 110I. Thermal insulation is provided between, for example, the exhaust and the nacelle 110N and between the combustion chamber 110C and the nacelle 110N to reduce heat transfer from combustion and the exhaust to the nacelle 110N. The one or more indicator devices 200 may be placed on any suitable portion of the nacelle 110N to measure, for example, the temperature exposure of the nacelle 110N from the combustion and exhaust of the engine 110. While placement of the one or more indicator devices 200 on the engine 110 is described, it should be understood that the indicator devices 200 can be placed at any location on the aircraft 100 for evaluating any suitable determinable quantity (e.g., thermal and/or mechanical) on any suitable predetermined area of the aircraft 100.

Referring to FIG. 2, the indicator device 200 includes a protective layer 201, an optically reflective layer 203 and polymeric material layer 202 disposed between the protective layer 201 and the optically reflective layer 203 for coupling the protective layer 201 and the optically reflective layer 203 to each other. The protective layer 201 may be any suitable optically transparent protective material such, as for example, a fluoropolymer layer. In one aspect, the fluoropolymer layer is ethylene tetrafluoroethylene, but in other aspects any suitable protective material may be used to protect the polymeric material layer 202 from contact with foreign objects including debris, human fingers, etc. The optically reflective layer 203 may be constructed of any suitable optically reflective material, such as aluminum, polytetrafluoroethylene, or any other suitable metal, polymer, composite, etc., that substantially prevents light transmission through the optically reflective layer 203.

The polymeric material layer 202 includes any suitable dye 205 that is sensitive to external stimuli, such as a thermally sensitive or mechanical force sensitive dye. For example, the polymeric material layer 202 comprises any suitable polymer or adhesive matrix, such as a pressure sensitive adhesive PSA or any other polymeric or adhesive layer configured to bond the protective layer 201 and the optically reflective layer 203 to each other and suspend the dye 205. The dye 205 is mixed or dissolved in the pressure sensitive adhesive PSA. The dye 205 is configured so that the dye 205 is activated, in the case of temperature detection, within any suitable predetermined temperature range where for example, when activated, the luminescence or absorbance of the dye 205 changes depending on the temperature and amount of exposure to that temperature. In one aspect, the dye 205 also visibly changes color to identify heat affected areas. As can be seen in FIG. 2, the optically reflective layer 203 may, for example, double a length of the light path through the polymeric material layer 202 thereby improving sensitivity by increasing the light path length in which the light interacts with the dye 205 (e.g., the light passing into the temperature indicator 200, as well as the light reflected by the optically reflective layer 203, interacts with the dye 205).

Still referring to FIG. 2, the indicator device 200 also includes another polymeric material layer 204. For example, the optically reflective layer 203 includes a first side 203S1 and a second side 203S2. The polymeric material layer 202, including the dye 205, is disposed on the first side 203S1 and the other polymeric material layer 204 is disposed on the second side 203S2 of the optically reflective layer 203, opposite the polymeric material layer 202. The other polymeric material layer 204 provides for coupling of the indicator device 200 to the part 250. The other polymeric material layer 204 has any suitable adhesive properties to hold the indicator device 200 to the part 250 during thermal evaluation while allowing removal of the indicator device 200 from the part 250 substantially without leaving, adhesive residue on the part 250. In one aspect, the other polymeric material layer 204 includes any suitable pressure sensitive adhesive PSA3 that in one aspect is the same as (or in other aspects is different than) the pressure sensitive adhesive PSA of the polymeric material layer 202 as described herein. It is noted that the optically reflective layer 203 of the present disclosure provides for the use of any suitable pressure sensitive adhesive when compared to conventional sensors. For example, conventional sensors can only employ pressure sensitive adhesives that are optically compatible with the dye being used and the measurement technique being used.

One or more of the protective layer 201 and the optically reflective layer 203 comprises a film. For example, one or more of the protective layer 201 and the optically reflective layer 203 have any suitable respective thickness T1, T3. In one aspect each of the thicknesses T1, T3 may be on the order a few thousandths of an inch. For example, the thicknesses T1, T3 are between about 0.001 inch and about 0.002 inch; while in other aspects the thicknesses T1, T3 may be more than about 0.002 inch or less than about 0.001 inch. The polymeric material layer 202 and the other polymeric material layer 204 may also have any suitable respective thickness T2, T4. In one aspect each of the thicknesses T2, T4 may be on the order a few thousandths of an inch. For example, the thicknesses T2, T4 are between about 0.001 inch and about 0.002 inch; while in other aspects the thicknesses T2, T4 may be more than about 0.002 inch or less than about 0.001 inch. The thicknesses T1, T2, T3, T4 are such that the indicator device 200 is formed as an adhesive tape that conforms to a contour of the part 250 to which the indicator device 200 is applied. Aspects of the present disclosure provide for a temperature (or mechanical force) indicator 200 in the form of a tape that is placed on a part 250 to monitor the part 250 during use (e.g., to monitor, for example, thermal activity in-situ).

As noted above, the dye 205 included in the polymeric material layer 202 is optically isolated from the part 250 by the optically reflective layer 203. The optical isolation of the dye 205 from the part 250 decouples the thickness T2 of the polymeric material layer 202 from the type of material from which the part 250 is constructed. For example, in order to effectively block any interference produced by the part during spectrometry of the indicator device 200, the thickness T2 of die polymeric material layer 202 should be sufficiently great so that any luminescence/absorbance of the part does not affect the spectrometry of the indicator device 200. As another example, in order to effectively block any interference produced by the part during spectrometry of the indicator device 200 the concentration of the dye 205 should be increased (which leads to prohibitive costs and may interfere with the ability of the polymeric material ability to bond with the protective layer 201 and the optically reflective layer 203). As a further example, in order to effectively block any interference produced by the part during spectrometry of the indicator device 200 a dye 205 may be used having such a unique signal (Which may not exist) that the signal from the part 250 will not interfere with the spectrometry. Disposing the reflective layer between the dye 205 and the part 250 allows the polymeric material layer 202 to be thin (as noted above) and flexible substantially without interference from the part 250. The optical isolation of the dye 205 may also provide for a decreased concentration of dye 205 in the polymeric material layer 202 compared to a concentration of the dye 205 that would otherwise be needed to sufficiently block interference from the part 250 during spectrometry of the indicator device 200.

Referring now to FIG. 3, in one aspect, the indicator device 200 includes a plurality of sensor elements 200E1, 200E2, 200E3, 200E4 that are each substantially similar to the indicator device 200 described above with respect to FIG. 2. However, in this aspect, at least one sensor element 200E1, 200E3 of the plurality of sensor elements 200E1, 200E2, 200E3, 200E4 includes the protective layer 201, the optically reflective layer 203, the polymeric material layer 202A, 202B disposed between and coupling the protective layer to the optically reflective layer, and, the dye (e.g., a first dye 205A and a second dye 205B) disposed within a respective one of the polymeric material layer 202A, 202B. For example, the at least one of the plurality of sensor elements 200E1, 200E3 includes a first sensor element 200E1 and a second sensor element 200E3. Here, the pressure sensitive adhesives PSA1, PSA2 of the respective polymeric material layers 202A, 202B may have different adhesive characteristics. For example, the pressure sensitive adhesives PSA1, PSA2 are configured such that the respective one of the first dye 205A and the second dye 205B is dissolvable into the respective pressure sensitive adhesive PSA1, PSA2. As such, in one aspect, the pressure sensitive adhesives PSA1, PSA2 may be different from each other; while in other aspects the pressure sensitive adhesives PSA1, PSA2 may be the same, depending on an ability of the respective one of the first dye 205A and the second dye 205B to be dissolved in the pressure sensitive adhesives PSA1, PSA2. The pressure sensitive adhesive PSA3 of the polymeric material layer 204 may be the same as one of the pressure sensitive adhesives PSA1, PSA2, or in other aspects the pressure sensitive adhesive PSA3 of the polymeric material layer 204 may be different than one or more of the pressure sensitive adhesives PSA1, PSA2.

Still referring to FIG. 3, the first dye 205A and the second dye 205B have different luminescent/absorbent characteristics so that the luminescence/absorbency profiles of each of the first dye 205A and the second dye 205B are different. In one aspect, in the case of the indicator device 200 being a temperature indicator device, the first dye 205A and the second dye 205B are configured to activate at substantially the same predetermined temperature; while in other aspects the first dye 205A and the second dye 205B are configured to activate at different temperatures. For example, the second dye 205B may be configured to activate at a lower temperature than the first dye 205A. By using dyes that are sensitive to different temperature ranges, the sensor elements 200E1, 200E2, 200E3, 200E4 of one or more indicator devices 200 can be multiplexed, so the combination of the multiplexed sensor elements 200E1, 200E2, 200E3, 200E4 provides a more diverse/smarter indicator device.

During thermal evaluation of the part 250 (FIG. 2) the first dye 205A and the second dye 205B are used in combination (e.g., interrogation data from both dyes are used in combination) to be a time-temperature (e.g., heat) indicator of thermal exposure/damage. While a single dye (such as any one of dyes 205, 205A, 205B) can be used to determine certain aspects of the time-temperature profile, by using two thermally sensitive dyes, where each of the two thermally sensitive dyes (e.g., the first dye 205A and the second dye 205B) is affected differently by temperature over time, a true time-temperature indicator analysis can be performed. This time-temperature indicator not only determines the temperatures reached, but also the duration of those temperatures.

Still referring to FIG. 3, at least another sensor element 200E2, 200E4 of the plurality of sensor elements 200E1, 200E2, 200E3, 200E4 includes the protective layer 201, the optically reflective layer 203 and, the polymeric material layer 202A, 202B coupling the protective layer 201 to the optically reflective layer 203. The at least another sensor element includes a third sensor element 200E2 and a fourth sensor element 200E4 that act as controls for a respective one of the sensor elements 200E1, 200E3. For example, the sensor element 200E2 is substantially the same as sensor element 200E1; however, the polymeric material layer 202A of the sensor element 200E2 does not include any dye. Similarly, the sensor element 200E4 is substantially the same as sensor element 200E3; however, the polymeric material layer 202B of the sensor element 200E4 does not include any dye. As such, as the plurality of sensor elements 200E1, 200E2, 200E3, 200E4 are exposed to heat, any change in polymeric material layer 202A due to thermal effects on the pressure sensitive adhesive PSA1 can be subtracted from the spectrograph when analyzing, for example, the fluorescence/absorbency profile of the dye 205A. Likewise, any change in polymeric material layer 202B due to thermal affects on the pressure sensitive adhesive PSA2 can be subtracted from the spectrograph when analyzing, for example, the fluorescence/absorbency profile of the dye 205B.

As can be seen in FIG. 3 and also referring to FIG. 3A, each of the plurality of sensor elements 200E1, 200E2, 200E3, 200E4 are configured as separate and distinct adhesive tape strips TS1, TS2, TS3, TS4. Each of the tape strips TS1, TS2, TS3, TS4 has any suitable width W that provides for the capture of thermal gradients within the part 250 (FIG. 2) in a predetermined area of the part 250 being analyzed. In one aspect the width W is about 0.5 inches, while in other aspects the width W may be more or less than about 0.5 inches. As the plurality of sensor elements 200E1, 200E2, 200E3, 200E4 are in the form tape strips TS1, TS2, TS3, TS4, the length L of each sensor element 200E1, 200E2, 200E3, 200E4 may be a preset length or a custom length where each sensor element is cut to an as needed length from, for example, a roll of tape (see FIG. 3A illustrating cutting a length L of sensor element 200E1 from a roll of tape RT formed by the tape ship TS1). Here, the separate and distinct tape strips TS1, TS2, TS3, TS4 that form the respective sensor element 200E1, 200E2, 200E3, 200E4 can be coupled to the part 250 (FIG. 2), using the respective polymeric material layer 204, in any suitable arrangement/order.

Referring now to FIGS. 4 and 4A, in one aspect, the reflective layer 203 and polymeric material layer 204 of the indicator device 200 are common to the plurality of sensor elements 200SE1, 200SE2, 200SE3, 200SE4. Here the sensor elements 200SE1, 200SE2, 200SE3, 200SE4 are discrete sensor elements disposed on a common tape strip CTS formed by the optically reflective layer 203 and the polymeric material layer 204. In one aspect, the sensor elements 200SE1, 200SE2, 200SE3, 200SE4 are arranged on the optically reflective layer 203 in a repeating pattern RP of sensor elements where, for example, sensor elements 200SE1, 200SE2 including pressure sensitive adhesive PSA1 are disposed adjacent one another and sensor elements 200SE3, 200SE4 including pressure sensitive adhesive PSA2 are disposed adjacent one another. In one aspect, the sensor elements 200SE1, 200SE2, 200SE3, 200SE extend along the width W of the indicator device 200 where the width is any suitable width, such as described above with respect to FIG. 3, to capture thermal gradients within the part 250 (FIG. 2). The repeating pattern RP of sensor elements 200SE1, 200SE2, 200SE3, 200SE4 is arranged along a length LT of the temperature indicator 200. In this aspect, each of the sensor elements 200SE1, 200SE2, 200SE3, 200SE4 has a respective length L1, which may be any suitable length, which may also be sufficient to capture thermal gradients within the part 250 (FIG. 2). In one aspect, the indicator device 200 illustrated in FIGS. 4 and 4A may form a roll of tape substantially similar to the roll of tape RT illustrated in FIG. 3A so that the length LT of the indicator device 200 can be cut to any suitable length.

Referring to FIG. 5 as well as FIGS. 1 and 2, an exemplary operation of the indicator device 200 will be described. The indicator device 200 is coupled to a surface of the part 250 (FIG. 5, Block 501). As described above, the part 250 may be, for example, the nacelle 110N of the engine 110 on aircraft 100. In one aspect, the indicator device 200 may be applied to the part 250 for thermal evaluation of the part 250 during testing/manufacture of the aircraft 100; while in other aspects, the indicator device 200 may be applied to the part for thermal evaluation of the part during normal operation (such as, among other things, during testing or a typical processing operation) of the aircraft 100. After the part 250 has been tested/operated (so as to generate heat so that the part 250 undergoes thermal exposure with the indicator device 200 coupled thereto (FIG. 5, Block 502)—in this case the engine 110 is operated to expose the nacelle 110N to an operating temperature of the engine 110), the indicator device 200 is interrogated (FIG. 5, Block 503) in any suitable manner using any suitable method of spectroscopy, such as for example, one or more of absorbance spectroscopy, fluorescence spectroscopy, reflectance spectroscopy, transmission spectroscopy, and Raman spectroscopy. For example, as shown in FIG. 1, a spectrometer 150 may be used to interrogate the indicator device 200 where a probe 150P of the spectrometer 150 is placed over the indicator device 200 for observing how the temperature sensitive dye 205 transmits and absorbs light. Where the indicator device 200 includes the plurality of sensor elements 200E1, 200E2, 200E3, 200E4 (FIGS. 3, 4 and 4A), the probe 150P may be placed over each of the sensor elements 200E1, 200E2, 200E3, 200E4 to observe how each of the sensor elements transmits and absorbs light. Background noise generated by the part 250 is removed (FIG. 5, Block 504) by the reflective layer 203, so that the spectrometer 150 substantially only receives light transmission signals from the dye 205. Thermal effects on the indicator device 200 may be subtracted from the data obtained when interrogating the indicator device 200 in any suitable manner using, for example, sensor elements 200E2, 200E4 (FIGS. 3, 4 and 4A) as controls.

In one aspect, the reflective layer 203 provides for the use of white light (having a broad wavelength range) to interrogate the dye 205 of the temperature indicator 200, so that the wavelengths of the white light that are transmitted and absorbed are detected during spectrometry. As such, narrow wavelength ranges of light (e.g., separate lasers, light emitting diodes, or filters) are not needed to interrogate the different dyes 205A, 205B (see FIGS. 3 and 4). In addition, ambient light and changes to the pressure sensitive adhesives PSA1, PSA2 can be subtracted from the luminescence profile of the indicator device 200 (e.g., of the sensor elements 200E1, 200E3—see FIGS. 3 and 4) so that a more accurate time-temperature indication can be made.

The measured data obtained from interrogating the dye 205 (or dyes 205A, 205B—see FIGS. 3 and 4) is compared to predetermined calibration curves (which indicate how the dyes react to being exposed to predetermined temperatures for predetermined periods of time) to estimate the time-temperature history of the indicator device 200 and the part 250. The time-temperature results obtained by the comparison with the predetermined calibration curves are correlated to known standards or models for thermal damage to determine an extent of thermal damage to the part 250.

As described above, the aspects of the present disclosure provide for an indicator device (such as a temperature indicator, force indicator, stress indicator and/or strain indicator) that can be used to monitor/determine a value of a respective measurable quantity in a large array of environments (such as in automotive, marine and aerospace applications). Again, it is noted that while the aspects of the disclosed embodiment are described herein with respect to an indicator device 200 for indicating temperature, it should be understood that by using dyes that are sensitive to mechanical forces the indicator device would form a mechanical force indicator. For example, by using dyes that are sensitive to impact forces the indicator device would form an impact force indicator; by using dyes that are sensitive to stress forces the indicator device would form a stress indicator; and, by using dyes that are sensitive to strain forces the indicator device would form a strain indicator. The mechanical force indicators have the same structure and elements as the indicator device 200 for indicating temperature described above (with the exception that the thermally sensitive dye(s) is/are replaced with one or more dyes sensitive to mechanical forces). It should also be understood that the thermally sensitive dyes and the mechanical force sensitive dyes may be included on a common tape so that a single indicator device includes a plurality of sensor elements that sense one or more of temperature, impact force, stress and strain.

The following are provided in accordance with the aspects of the present disclosure:

A1. An indicator device comprising:
a protective layer;
an optically reflective layer;
an polymeric material layer disposed between and coupling the protective layer to the optically reflective layer; and
a dye disposed within the polymeric material layer, the dye being sensitive to external stimuli.

A2. The indicator device of paragraph A1 wherein, the polymeric material layer comprises a pressure sensitive adhesive.

A3. The indicator device of paragraph A1, wherein the optically reflective layer includes a first side and a second side opposite the first side, and the polymeric material layer is disposed on the first side, the indicator device further comprising a second polymeric material layer coupled to the second side of the optically reflective layer.

A4. The indicator device of paragraph A3, wherein the second polymeric material layer comprises a pressure sensitive adhesive.

A5. The indicator device of paragraph A1, wherein the protective layer comprises a fluoropolymer layer.

A6. The indicator device of paragraph A5, wherein the fluoropolymer layer comprises ethylene tetrafluoroethylene.

A7. The indicator device of paragraph A1, wherein the protective layer comprises a film.

A8. The indicator device of paragraph A1, wherein the optically reflective layer comprises a film.

A9. The indicator device of paragraph A1, wherein the dye is a thermally sensitive dye and the indicator device is a temperature indicator.

A10. The indicator device of paragraph A1, wherein the dye is sensitive to mechanical forces and the indicator device is one of an impact force indicator, a stress indicator, or a strain indicator.

B1. An indicator device comprising:
an optically reflective layer; and
a plurality of sensor elements disposed on the optically reflective layer, at least one of the plurality of sensor elements including
a protective layer;
an polymeric material layer disposed between and coupling the protective layer to the optically reflective layer; and
a dye disposed within the polymeric material layer, the dye being sensitive to external stimuli.

B2. The indicator device of paragraph B1, wherein the at least one of the plurality of sensor elements includes:
a first sensor element having an polymeric material layer with a first predetermined adhesive characteristic, and
a second sensor element having an polymeric material layer with a second predetermined adhesive characteristic different than the first predetermined characteristic.

B3. The indicator device of paragraph B1, wherein at least another of the plurality of sensor elements includes a protective layer and an polymeric material layer disposed between and coupling the protective layer to the optically reflective layer.

B4. The indicator device of paragraph B3, wherein the at least another of the plurality of sensor elements includes:
a third sensor element having an polymeric material layer with a first predetermined adhesive characteristic, and a fourth sensor element having an polymeric material layer with a second predetermined adhesive characteristic different than the first predetermined characteristic.

B5. The indicator device of paragraph B3, wherein the protective layer of the at least another of the plurality of sensor elements comprises a fluoropolymer layer.

B6. The indicator device of paragraph B4, wherein the fluoropolymer layer of the at least another of the plurality of sensor elements comprises ethylene tetrafluoroethylene.

B7. The indicator device of paragraph B1, wherein the at least one of the plurality of sensor elements includes:

a first sensor element, the dye of the first sensor element having a first predetermined dye characteristic, and a second sensor element, the dye of the second sensor element having a second predetermined dye characteristic different than the first predetermined dye characteristic.

B8. The indicator device of paragraph B1 wherein, the polymeric material layer comprises a pressure sensitive adhesive.

B9. The indicator device of paragraph B1, wherein the optically reflective layer includes a first side and a second side opposite the first side, and the polymeric material layer is disposed on the first side, the indicator device further comprising a second polymeric material layer coupled to the second side of the optically reflective layer.

B10. The indicator device of paragraph B9, wherein the second polymeric material layer comprises a pressure sensitive adhesive.

B11. The indicator device of paragraph B1, wherein the plurality of sensor elements are discrete sensor elements.

B12. The indicator device of paragraph B1, wherein the plurality of sensor elements are arranged on the optically reflective layer in a repeating pattern of sensor elements.

B13. The indicator device of paragraph B1, wherein the protective layer comprises a film.

B14. The indicator device of paragraph B1, wherein the optically reflective layer comprises a film.

B15. The indicator device of paragraph B1, wherein the protective layer comprises a fluoropolymer layer.

B16. The indicator device of paragraph B15, wherein the fluoropolymer layer comprises ethylene tetrafluoroethylene.

B17. The indicator device of paragraph B1, wherein the dye comprises a thermally sensitive dye and the indicator device is a temperature sensor.

B18. The indicator device of paragraph B1, wherein the dye is sensitive to mechanical forces and the indicator device is one of an impact force indicator, a stress indicator, or a strain indicator.

C1. A method for measuring a determinable quantity, the method comprising:

coupling an indicator device to a surface of a part, where the indicator device includes at least one sensor element having a protective layer, an optically reflective layer, an polymeric material layer disposed between and coupling the protective layer to the optically reflective layer, and a dye disposed within the polymeric material layer, the dye being sensitive to external stimuli; and interrogating the indicator device in the visible spectrum with one or more of absorbance spectroscopy, fluorescence spectroscopy, reflectance spectroscopy, transmission spectroscopy, and Raman spectroscopy to determine a value of the determinable quantity affecting the part.

C2. The method of paragraph C1, wherein the optically reflective layer removes background noise generated by the part.

C3. The method of paragraph C1, wherein the dye is a thermally sensitive dye and the determinable quantity affecting the part comprises a maximum temperature to which the part was exposed.

C4. The method of paragraph C1, wherein the dye is sensitive to mechanical forces and the determinable quantity affecting the part comprises an impact force, a stress, or a strain.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 5, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 5 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. An indicator device for non-destructive evaluation of external stimuli on a part, the indicator device comprising:
   a protective layer;
   an optically reflective layer;
   a polymeric material layer disposed between and coupling the protective layer to the optically reflective layer; and
   a dye disposed within the polymeric material layer, the dye being sensitive to external stimuli;
   wherein the optically reflective layer is configured to optically isolate the dye and remove background noise generated by the part so as to improve a signal-to-noise ratio of the indicator device.

2. The indicator device of claim 1 wherein, the polymeric material layer comprises a pressure sensitive adhesive.

3. The indicator device of claim 1, wherein the optically reflective layer includes a first side and a second side opposite the first side, and the polymeric material layer is disposed on the first side, the indicator device further comprising a second polymeric material layer coupled to the second side of the optically reflective layer.

4. The indicator device of claim 1, wherein the protective layer comprises a fluoropolymer layer.

5. The indicator device of claim 1, wherein the protective layer comprises a film.

6. The indicator device of claim 1, wherein the optically reflective layer comprises a film.

7. An indicator device comprising:
   an optically reflective layer; and
   a plurality of sensor elements disposed on the optically reflective layer, at least one of the plurality of sensor elements including
      a protective layer;
      a polymeric material layer disposed between and coupling the protective layer to the optically reflective layer; and
      a dye disposed within the polymeric material layer, the dye being sensitive to external stimuli;
   wherein the plurality of sensor elements are arranged on the optically reflective layer in a repeating pattern of sensor elements.

8. The indicator device of claim 7, wherein the at least one of the plurality of sensor elements includes:
   a first sensor element, the dye of the first sensor element having a first predetermined dye characteristic, and
   a second sensor element, the dye of the second sensor element having a second predetermined dye characteristic different than the first predetermined dye characteristic.

9. The indicator device of claim 7 wherein, the polymeric material layer comprises a pressure sensitive adhesive.

10. The indicator device of claim 7, wherein the optically reflective layer includes a first side and a second side opposite the first side, and the polymeric material layer is disposed on the first side, the indicator device further comprising a second polymeric material layer coupled to the second side of the optically reflective layer.

11. The indicator device of claim 10, wherein the second polymeric material layer comprises a pressure sensitive adhesive.

12. The indicator device of claim 7, wherein the plurality of sensor elements are discrete sensor elements.

13. The indicator device of claim 7, wherein the protective layer comprises a film.

14. The indicator device of claim 7, wherein the optically reflective layer comprises a film.

15. The indicator device of claim 7, wherein the protective layer comprises a fluoropolymer layer.

16. The indicator device of claim 15, wherein the fluoropolymer layer comprises ethylene tetrafluoroethylene.

17. The indicator device of claim 7, wherein:
the dye is a thermally sensitive dye and the indicator device comprises a temperature indicator; or
the dye is sensitive to mechanical forces and the indicator device comprises one of an impact force indicator, a stress indicator, or a strain indicator.

18. A method for measuring a determinable quantity, the method comprising:
coupling an indicator device to a surface of a part, where the indicator device includes at least one sensor element having
a protective layer,
an optically reflective layer that removes background noise generated by the part,
a polymeric material layer disposed between and coupling the protective layer to the optically reflective layer, and
a dye disposed within the polymeric material layer, the dye being sensitive to external stimuli; and
interrogating the indicator device in a visible spectrum with one or more of absorbance spectroscopy, fluorescence spectroscopy, reflectance spectroscopy, transmission spectroscopy, and Raman spectroscopy to determine a value of the determinable quantity affecting the part.

19. The method of claim 18, wherein the dye is a thermally sensitive dye and the determinable quantity affecting the part comprises a maximum temperature to which the part was exposed.

20. The method of claim 18, wherein the dye is sensitive to mechanical forces and the determinable quantity affecting the part comprises an impact force, a stress, or a strain.

* * * * *